(12) United States Patent
Lassus et al.

(10) Patent No.: US 8,167,099 B2
(45) Date of Patent: May 1, 2012

(54) VEHICLE DAMPER

(75) Inventors: Vincent Lassus, Marseilles (FR); Benjamin Talon, Cahors (FR); Cédric Lopez, Saint Cannat (FR)

(73) Assignee: Eurocopter, Marignane Cedex (FR)

( * ) Notice: Subject to any disclaimer, the term of this patent is extended or adjusted under 35 U.S.C. 154(b) by 820 days.

(21) Appl. No.: 12/248,366

(22) Filed: Oct. 9, 2008

(65) Prior Publication Data

US 2009/0095585 A1    Apr. 16, 2009

(30) Foreign Application Priority Data

Oct. 11, 2007   (FR) ...................................... 07 07131

(51) Int. Cl.
*F16F 9/48* (2006.01)
(52) U.S. Cl. ........................ 188/287; 188/297
(58) Field of Classification Search .................. 188/284, 188/286, 287, 297, 322.19; 267/64.17, 64.16; F16F 9/48
See application file for complete search history.

(56) References Cited

U.S. PATENT DOCUMENTS

| | | | | |
|---|---|---|---|---|
| 4,061,295 A | | 12/1977 | Somm | |
| 4,284,177 A | * | 8/1981 | Domek | 188/280 |
| 4,337,849 A | * | 7/1982 | Siorek et al. | 188/276 |
| 4,405,119 A | * | 9/1983 | Masclet et al. | 267/64.22 |
| 4,438,909 A | * | 3/1984 | Matsumoto | 267/64.26 |
| 4,623,049 A | * | 11/1986 | Warren | 188/281 |
| 4,742,898 A | * | 5/1988 | Lee | 188/287 |
| 4,805,882 A | | 2/1989 | Veaux et al. | |
| 4,807,860 A | | 2/1989 | Simons | |
| 5,050,712 A | * | 9/1991 | Heideman | 188/287 |
| 5,862,895 A | * | 1/1999 | Ricard | 188/289 |
| 6,202,807 B1 | * | 3/2001 | Levi | 188/282.7 |
| 6,454,061 B1 | * | 9/2002 | Antonovsky | 188/280 |
| 6,648,109 B2 | * | 11/2003 | Farr et al. | 188/287 |
| 6,648,310 B2 | * | 11/2003 | Rottenberger et al. | 267/64.26 |
| 7,635,051 B2 | * | 12/2009 | Beck | 188/322.2 |

FOREIGN PATENT DOCUMENTS

| | | |
|---|---|---|
| EP | 0280904 | 9/1988 |
| GB | 556148 | 9/1943 |
| GB | 2011018 | 7/1979 |
| GB | 2170294 | 7/1986 |

OTHER PUBLICATIONS

Search Report filed Jun. 26, 2008 in French priority application.

* cited by examiner

*Primary Examiner* — Bradley King
*Assistant Examiner* — Thomas Irvin
(74) *Attorney, Agent, or Firm* — Brooks Kushman P.C.

(57) ABSTRACT

A damper (1) is provided with a body (2) which surrounds an annular compression chamber (3), the damper (1) being furnished with at least one pneumatic compensation chamber (30, 40) and a control piston (4) that can move relative to the body (2), the control piston (4) having a rod (5) which protrudes from the body (2) and a head (6) which slides in the compression chamber (3). The damper is notable in that, the compression chamber (3) comprising a variable-section radial opening (8), the damper (1) is provided with a hydraulic compensation chamber (10) which receives a first fluid expelled from the annular compression chamber (3) via the variable-section radial opening (8) when the control piston (4) moves.

21 Claims, 2 Drawing Sheets

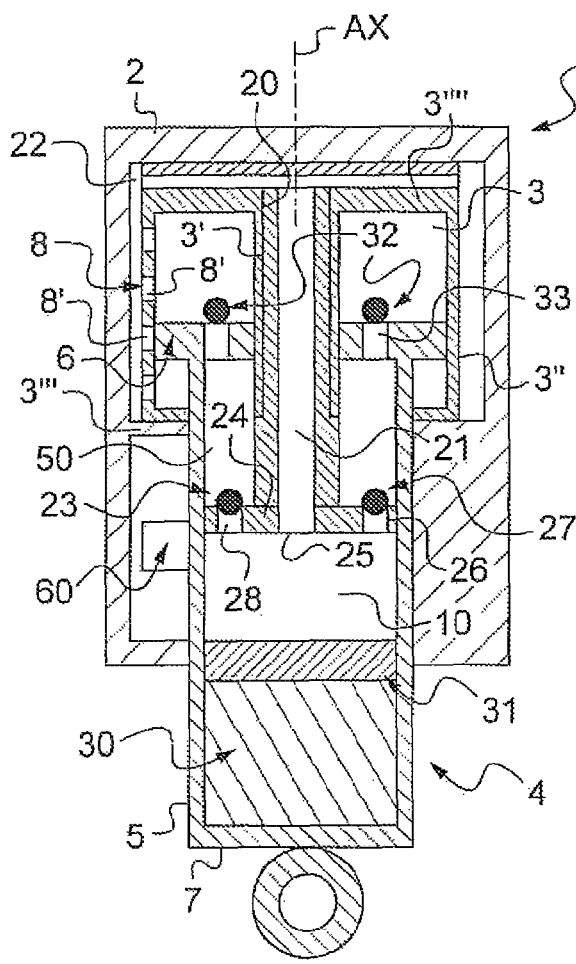
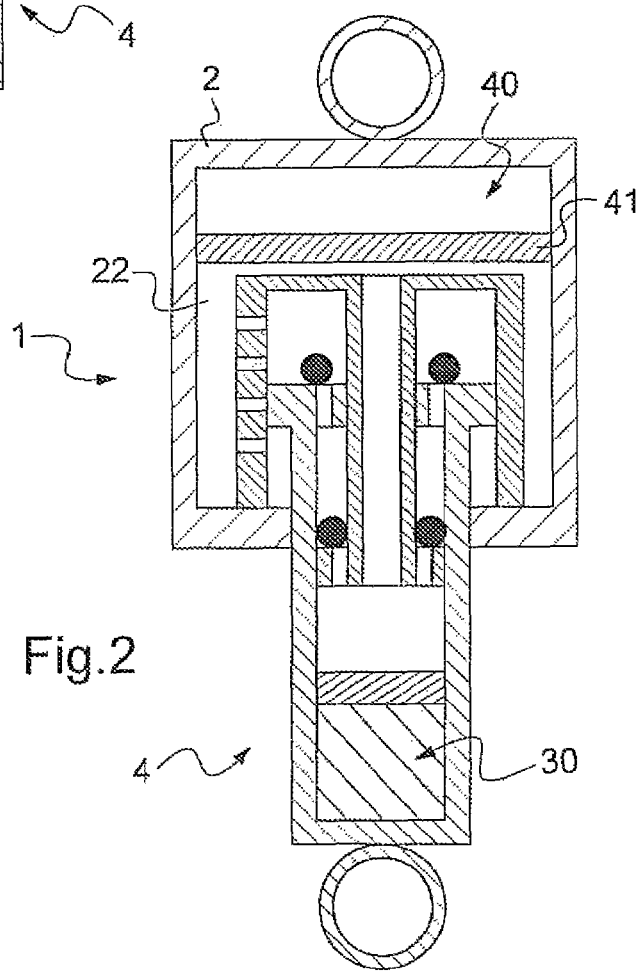

VEHICLE DAMPER

The present invention relates to a damper of a vehicle and in particular a damper arranged on the landing gear of a rotorcraft.

The invention is therefore situated in the technical field of dampers and more particularly in the technical field of rotorcraft landing gear dampers.

BACKGROUND OF THE INVENTION

Document FR553667 describes a first damper comprising a piston furnished with a head traversed by a through rod, this through rod having an upper rod and a lower rod on either side of the piston head.

The piston head then slides in a compression chamber of the damper, the lower and upper rods of the piston being respectively in the lower portion and the upper portion of the compression chamber.

In addition, the compression chamber comprises a plurality of radial bores, placed longitudinally over its periphery, these radial bores opening onto a channel connecting the upper portion of the compression chamber to its lower portion. Note that each bore is obstructed by a valve.

When the damper is stressed in compression, the piston makes a translation movement and expels the fluid contained in the upper portion of the compression chamber via the radial bores.

This expulsion causes a throttling of the fluid which thereby generates a damping.

Note that the piston head masks the radial bores one after the other, as the piston progresses in the compression chamber. Consequently the section of leakage of the fluid diminishes with the progression of the piston which makes it possible to progressively increase the damping generated by the damper.

This first damper therefore fulfils a damping function well. Nevertheless, if the piston moves slowly, it is understood that the damping will be virtually non-existent. Also, being inversely proportional to the dimension of the bores, a large-sized bore that is easy to produce induces a weak damping action.

Document FR2601097 has a second damper provided with a piston sliding in a sealed manner inside a compression chamber.

The piston being of cylindrical shape, the lower base of the piston entering the compression chamber is furnished with longitudinal orifices.

These orifices make it possible to place the compression chamber of the damper in communication with a hydraulic chamber inserted in the piston rod.

During an axial movement of the piston, caused by the compression of the damper, the fluid of the compression chamber is throttled by the longitudinal orifices in order to enter the hydraulic chamber, which is the source of the damping achieved by the damper.

In addition, the piston rod grips elastic means in contact with the hydraulic chamber.

Since the hydraulic chamber fills with the fluid originating from the compression chamber via the longitudinal orifices, the volume of this hydraulic chamber tends to increase which causes the elastic means to contract.

Consequently, when the rotorcraft lands, the piston moves rapidly which induces a throttling of the fluid of the compression chamber.

On the other hand, in a static situation, when the rotorcraft is on the ground, the piston will not move rapidly. The damping will then be generated by the contraction of the elastic means.

This second damper therefore makes it possible to fulfil a damping function, both according to the speed of movement of the piston but also according to its movement, because respectively of the longitudinal openings and the elastic means.

However, unlike the first damper, it is noted that this second damper does not provide any variable-section radial bores, the longitudinal orifices not being provided in order to be obstructed notably. The throttling of the fluid, and the resultant damping, can therefore not be modulated and adapted according to the situation encountered with the aid of such bores. However, the second damper is fitted with a throttle needle for filling a similar function.

It is noted that the technical features of the first damper would not be able to be used in the context of the second damper, the throttling orifices being on the one hand longitudinal and not radial, and, on the other hand, placed on the piston itself, this piston therefore not being able to mask its own orifices.

OBJECTS AND SUMMARY OF THE INVENTION

The object of the present invention is to propose a damper for a vehicle, and particularly a rotorcraft, making it possible to generate a damping proportional to the movement and the speed of penetration of the damper piston, the damping necessarily becoming progressive and gentle.

According to the invention, a damper is provided with a body in which an annular compression chamber is placed. This body therefore encircles, surrounds, an annular compression chamber. This damper is also furnished with at least one pneumatic compensation chamber and a control piston that can move relative to the body, the control piston having a rod which protrudes from said body of the damper and a head which slides in the compression chamber.

The invention is notable in that, the compression chamber attached to the body comprising a variable-section radial opening in operation according to the movement of the piston, this damper is provided with a hydraulic compensation chamber which receives a first fluid expelled from the annular compression chamber via the variable-section radial opening when the control piston moves.

Consequently, when there is a rapid movement of the control piston, this control piston expels the first fluid from the compression chamber through the variable-section radial opening. The throttling of this first fluid causes a damping of the stress sustained by the damper.

The first fluid is then directed towards a hydraulic compensation chamber.

Since the total section of the radial opening is variable, the damping will be progressive, this damping increasing as the head of the control piston penetrates the compression chamber.

In addition, the damper is furnished with a pneumatic compensation chamber. This pneumatic chamber makes it possible, on the one hand, to compensate for the movement of the first fluid when the damper is compressed by increasing the volume of the hydraulic compensation chamber and, on the other hand, to provide a minimal clearance for the vehicle fitted with the invention. Specifically, the pneumatic compensation chamber makes it possible to prevent the control piston from completely expelling the first fluid from the compression chamber by locking the control piston in a static position.

Furthermore, in order to optimize the dimensions of the damper, the hydraulic compensation chamber is arranged inside the rod of the control piston.

Advantageously, the variable-section radial opening comprises a plurality of radial bores, arranged in the compression chamber and arranged in a longitudinal direction of the annular compression chamber. The radial bores are then successively masked by the control piston when this control piston moves, more precisely when the head of the control piston penetrates the compression chamber due to a compression of the damper.

According to another variant of the invention, the radial bores are made in a helical direction. Therefore, a given point of the control piston does not move past all the bores which spectacularly reduces the wear of the piston.

Irrespective of the variant used to produce the radial bores since the control piston masks the radial bores of the compensation chamber one after the other during the compression of the damper, the radial opening has a section which reduces gradually as the control piston moves. The leakage section of the first fluid varies while diminishing during a compression of the damper which leads to a progressive damping, this damping becoming greater.

In addition, the annular compression chamber being furnished with an inner cylindrical wall and an outer cylindrical wall, the inner wall surrounds a hollow cylindrical tube forming a first channel, this first channel making it possible to place the compression chamber in communication with the hydraulic compensation chamber.

It is noted that the inner wall is separated from the longitudinal axis of the compression chamber by a first distance that is less than a second distance separating the outer wall from this compression chamber.

In addition, the hollow cylindrical tube is attached to the inner wall, the compression chamber and the cylindrical tube forming for example one and the same mechanical part.

Finally, the hollow cylindrical tube may protrude from the compression chamber and penetrate the rod of the control-piston.

Therefore, the first channel opens onto the hydraulic compensation chamber and may therefore carry the first fluid up to this hydraulic compensation chamber.

According to a first variant of the invention, the annular compression chamber being furnished with an inner cylindrical wall and an outer cylindrical wall, the variable-section radial opening is arranged in the outer wall.

The inner wall surrounding the hollow cylindrical tube forming a first channel, the damper comprises a second channel in order to hydraulically connect the variable-section radial opening to the first channel, this second channel being arranged between the body of the damper and the compression chamber.

The first fluid therefore leaves the compression chamber via the variable-section radial opening then traverses successively the second and then the first channel before reaching the hydraulic compensation chamber.

According to a second variant of the invention, the annular compression chamber being furnished with an inner cylindrical wall and an outer cylindrical wall, the inner wall surrounding a hollow cylindrical tube forming a first channel, the variable-section radial opening is arranged in the inner wall and the cylindrical tube.

The variable-section radial opening then leads directly into the first channel.

According to a first embodiment, the damper is furnished with a first pneumatic compensation chamber placed inside the rod of the control piston while being arranged between a bottom of this rod and the hydraulic compensation chamber.

Depending on the nature of this first pneumatic compensation chamber, a first divider may separate the first pneumatic compensation chamber from the hydraulic compensation chamber.

This arrangement is important notably when the first fluid is oil, the first pneumatic compensation chamber being filled with a pressurized gas. Specifically, the first divider therefore prevents the gas from mixing with the oil.

However, the first divider seems less important if the first pneumatic compensation chamber is filled with an elastomer.

Advantageously, the first divider may be produced with the aid of a first movable divider piston, or else with a membrane that can be deformed according to the pressure exerted on the latter. The application of a membrane instead of a movable divider piston is then particularly inventive since it makes it possible to prevent the use of a movable part that is likely to generate leaks or else premature wear because of the friction generated.

According to a second embodiment, the damper comprises a second pneumatic chamber.

The compression chamber surrounding a hollow cylindrical tube forming a first channel, the damper comprising a second channel in order to hydraulically connect the variable-section radial opening to the first channel, the damper is then furnished with a second pneumatic compensation chamber placed inside the body while being arranged between the second channel and the body.

The second pneumatic compensation chamber is therefore placed outside the control piston.

As for the first pneumatic compensation chamber, a second divider separates the second pneumatic compensation chamber from the second channel. The second divider nay be produced with the aid of a second movable divider piston, or else with a membrane that can be deformed according to the pressure exerted on the latter.

Preferably, the damper comprising a first and a second pneumatic compensation chamber, one pneumatic chamber is at low pressure while the other pneumatic chamber is at high pressure.

For example, the first pneumatic compensation chamber is filled with a gas at low pressure of between 4 and 10 bar, while the second pneumatic compensation chamber is filled with a gas at high pressure of between 25 and 100 bar.

This arrangement confers on the invention a dual-slope spring law which makes it possible to manage any variations in the weight of the vehicle fitted with the invention. For example, on an aircraft, these weight variations may reach several tonnes depending on the loading of this aircraft.

If the damper is defined with the aid of a single-spring law, this spring law will be designed according to the maximum weight that the aircraft can achieve. Consequently, the control piston of the damper will be able to travel only a very short distance which induces a limited damping.

On the other hand, according to the second embodiment, the damper is furnished with a first and a second pneumatic chamber. Since the first pneumatic chamber is filled with a gas at low pressure, this first chamber will be able to be compressed in a first time which allows the control piston to move and finally to generate the required damping. In a second time, the second pneumatic chamber will be stressed and will lock the control piston in a static position in order to ensure a minimal ground clearance for the vehicle.

Finally, the damper advantageously comprises an expansion and compression means allowing the control piston to move.

The damper comprising a hollow cylindrical tube of which one end leads into the hydraulic compensation chamber, the expansion and compression means is provided with a disk arranged at this end of the cylindrical tube, the disk being hollowed out at its centre so as not to obstruct the first channel formed by the cylindrical tube and having an outer periphery having a sealed contact with the inside of the rod of the control piston.

In addition, the expansion and compression means comprises at least a first non-return valve, preloaded if necessary, obstructing at least a first calibrated perforation of the disk.

In addition, the expansion and compression means is furnished with at least a second non-return valve, preloaded if necessary, obstructing at least a second calibrated perforation of the head of the control piston, the second perforations making it possible to place the compression chamber in communication with an expansion chamber arranged inside the control piston between the disk and the head.

When the damper is compressed, the head of the control piston tends to move away from the disk of the expansion and compression means. Consequently, the volume of the expansion chamber increases which generates a pressure reduction in this expansion chamber.

On the contrary, the pressure exerted in the hydraulic compensation chamber increases.

The combined effects of the pressure reduction generated in the expansion chamber and the pressure increase in the hydraulic compensation chamber cause a movement of the first non-return valve, this first non-return valve no longer obstructing the first perforation of the disk.

The first fluid may then travel from the first hydraulic compensation chamber to the expansion chamber which allows the control piston to move.

It is noted that, on the contrary, the pressure increase generated in the compression chamber holds the second non-return valve against the second perforations of the control head of the piston.

When there is an expansion of the damper, caused for example by an aircraft fitted with the invention on its landing gear taking off, the head of the control piston moves closer to the disk of the expansion and compression means.

Since the volume of the expansion chamber reduces, the pressure of the first fluid prevailing in this expansion chamber increases. The first fluid contained in the expansion chamber then pushes the second non-return valve and therefore enters the compression chamber.

On the other hand, it is understood that the first non-return valve remains pressed against the first perforations.

In addition, the first fluid contained in the hydraulic compensation chamber returns to the compression chamber by following the first channel, and if necessary the second channel depending on the chosen embodiment.

The first fluid therefore returns to the compression chamber which allows the control piston to return to its original position.

BRIEF DESCRIPTION OF THE DRAWINGS

The invention and its advantages will appear in greater detail in the context of the following description with exemplary embodiments given as an illustration with reference to the appended figures which represent.

FIG. 1, a section showing a damper according to a first embodiment,

FIG. 2, a section showing a damper according to a second embodiment,

Figure 3:
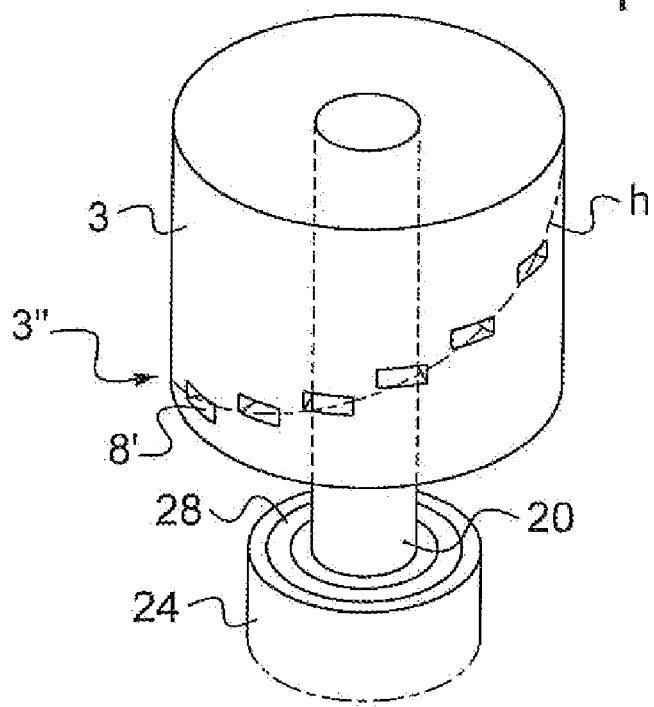
FIG. 3, an isometric view of the compression chamber furnished on its outer wall with radial bores placed in a helix, and FIG. 4, an isometric view of the compression chamber furnished on its inner wall with radial bores placed in a helix.

The elements present in several separate figures are allocated one and the same reference.

MORE DETAILED DESCRIPTION

In order to explain the operation of the damper, the consideration will be given in the rest of the text that the invention is arranged on an aircraft landing gear. However, this application should not be considered limitative.

FIG. 1 shows a section of a damper 1 according to a first embodiment comprising a body 2 in which a control piston 4 slides.

Specifically, this body 2 grips an annular and cylindrical compression chamber 3, the bottom base 3''' of this compression chamber being attached to the body 2.

The compression chamber 3 is therefore fixed relative to the body 2 that receives it.

On the contrary, the control piston 4 is furnished with a rod 5 provided with a head 6 on one side and a bottom 7 on the other side. The head 6 of the control piston 4 is then arranged in the annular compression chamber 3.

Therefore, the head 6 of the control piston 4 is capable of making a translation movement along the longitudinal axis AX of the compression chamber 3, by sliding in this compression chamber 3. The control piston 4 is therefore movable relative to the body 2.

In addition, the inner wall 3' of the compression chamber surrounds a hollow tube 20 which forms a first channel, this inner wall 3' being the lateral wall of the compression chamber 3 closest to the longitudinal axis AX.

In addition, the inner wall 3' of the compression chamber is attached to the hollow tube 20, which is consequently immobile relative to the body, the compression chamber 3 and the hollow tube being able to form one and the same mechanical part.

Moving radially away from the longitudinal axis AX, there is therefore successively the first channel 21, the hollow tube 20 then the inner wall 3' of the compression chamber 3.

Finally, note that the hollow tube 20 protrudes from the compression chamber 3 on the side of the bottom 7 of the control piston 4, so as to penetrate more deeply into the rod 5 of the control piston 4.

Furthermore, the annular compression chamber is provided with a variable-section opening 8. This variable-section opening then has a plurality of radial bores 8' placed one above the other along the longitudinal axis AX.

According to a first variant of the invention, these radial bores are arranged on an outer wall 3" of the compression chamber, the outer wall of the compression chamber being the lateral wall furthest from the longitudinal axis.

According to this variant, the outer wall 3" and the top base 3"" of the compression chamber not being in contact with the body 2, the radial bores 8' lead into a second channel 22, this second channel 22 being placed between the body 2 and the outer wall 3" of the compression chamber 3 then between the body 2 and the top base 3"" of the compression chamber 3.

The second channel 22 then leads into the first channel 21, in order to place this first channel 21 in communication with the variable-section radial opening 8.

According to a second variant not shown, the radial bores 8' are arranged on the inner wall 3' of the compression chamber and on the cylindrical tube, a bore of the inner wall being in view of a bore of the cylindrical tube.

The second channel 22 becoming useless, the outer wall 3" and the top base 3"" of the compression chamber 3 may be attached to the body 2 for example.

Irrespective of the variant, the first channel leads into a hydraulic compensation chamber 10 arranged inside the rod 5 of the control piston 4.

This hydraulic compensation chamber 10 is then separated from a first pneumatic compensation chamber 30 by a first movable divider 31, made with the aid of a first divider piston or of an elastomer membrane for example. Note that the first pneumatic compensation chamber 30 is also arranged inside the rod 5 of the control piston 4 while notably being adjacent to the bottom 7 of this control piston 4.

It should be noted that the first divider is optional, this first divider being for example useless if the first pneumatic compensation chamber 30 consists of an elastomer. Specifically, the function of the first divider is to prevent the fluid or material filling the first pneumatic compensation chamber 30 from moving and mixing with the fluid filling the hydraulic compensation chamber 10.

Consequently, the damper 1 is capable of damping impacts, such as the impacts sustained by a rotorcraft landing gear.

The damper 1 is then arranged on the leg of this landing gear. Since the rod 5 of the control piston 4 protrudes from the body 2 of the damper, this rod 4 may therefore be attached to the spindle of a wheel.

At the time of landing, the wheel of the landing gear will push the rod 5 of the control piston 4. The latter then begins to slide inside the compression chamber 3.

The first fluid, oil, contained in the compression chamber 3 then escapes to the variable-section radial opening 8.

If the control piston moves at an average, even rapid, speed of the order of 0.1 to 2 meters per second, the throttling of the first fluid through the variable-section radial opening 8 generates a damping of the impact due to landing.

In addition, note that the radial bores 8 of the variable-section radial opening 8 are masked one after the other by the head 6 of the control piston 4. The section of leakage of the first fluid reduces gradually as the control piston 4 progresses which increases by as much the damping effect.

The first fluid then joins the first channel 21, if necessary via the second channel 22 depending on the variant used then leads into the hydraulic compensation chamber 10.

Since the volume of the hydraulic compensation chamber 10 increases with the addition of the first fluid originating from the compression chamber, the pressure in the hydraulic compensation chamber 10 increases which moves the first divider 31.

This first divider 31 therefore exerts a compression force on the first pneumatic compensation chamber 30. This first pneumatic compensation chamber 30 then has three distinct functions.

In the first place, by compressing, it makes it possible to increase the volume of the hydraulic compensation chamber 10. The first fluid escaping from the compression chamber 3 is then received in totality by the hydraulic chamber which makes it possible to prevent a stoppage of the damper 1.

In the second place, during its compression, the first pneumatic compensation chamber 30 stores a portion of the energy generated during the landing of the rotorcraft. Note furthermore that if the landing occurs at a very slow speed, the throttling of the first fluid will be slight which means that the major portion of the said energy is then absorbed by the first pneumatic compensation chamber 30.

Finally, in the third place, the first pneumatic compensation chamber 30 limits the movement of the control piston 4. Specifically, the compression of this first pneumatic compensation chamber 30 being limited, when this compression reaches its maximum, it no longer becomes possible to reduce the volume of the first pneumatic compensation chamber 30 and therefore to increase the volume of the hydraulic compensation chamber 10. The control piston 4 is then held in a determined static position.

Furthermore, to make the movement of the control piston 4 easier, the damper 1 is furnished with an expansion and compression means provided with a disk 24 attached to one end 23 of the hollow tube 20, more precisely the end 23 of the hollow tube 20 closest to the bottom 7 of the rod 5 of the control piston 4.

Note that the outer periphery 26 of the disk 24 has a sealed contact with the inside of the rod 5 of the control piston 4.

In addition, the disk 24 having a plurality of first perforations 28, each first perforation is obstructed by a first non-return valve 27, preloaded if necessary. For example, the first perforations 28 consist of a hollow ring arranged in the disk 24, the first non-return valve 27 being a shim obstructing the said hollow ring.

Finally, the expansion and compression means is furnished with second non-return valves 32 obstructing a plurality of second perforations 33 arranged in the head 6 of the control piston 4. As above, the second perforations 33 may consist of a hollow ring arranged in the head 6 of the control piston 4, the second non-return valve 32 being a shim obstructing the said hollow ring.

The expansion and compression means then comprises an expansion chamber 50 placed actually inside the control piston 4 between the disk 24 and the head of the control piston 4.

Finally, the expansion chamber 50 surrounds the protruding portion of the hollow tube 20, namely the portion of the hollow tube 20 that protrudes from the compression chamber 3.

When the aircraft fitted with the damper lands, the damper compresses. Consequently the control piston moves, the head 6 of this control piston 4 moving away from the disk 24. This movement induces an increase of pressure in the compression chamber which causes an increase of pressure in the compensation chamber and therefore causes the first non-return valve 27 to open.

The first fluid contained in the hydraulic compensation chamber 10 may therefore go into the expansion chamber 50 while passing through the first perforations 28. The movement of the control piston 4 is therefore not hampered by the presence of this expansion chamber 50.

Note that the second non-return valve 32 on the contrary remains in position while obstructing the second perforations 33.

When the aircraft takes off for example, the damper expands. Consequently, the control piston 4 moves, the head 6 of this control piston 4 moving closer to the disk 24. This movement induces an increase of the pressure in the expansion chamber 50, the said increase making it possible to push the second non-return valve 32.

The first fluid contained in the expansion chamber 50 may then go into the compression chamber 3 while passing through the second perforations 33. The movement of the control piston 4 is therefore not hampered by the presence of this expansion chamber 50.

Note that the first non-return valve 27 on the contrary remains in position while obstructing the first perforations 28.

FIG. 2 represents a second embodiment of the invention.

The damper 1 is then fitted with a second pneumatic compensation chamber 40 arranged on the inside of the body 2 and on the outside of the control piston 4.

More precisely, the second pneumatic compensation chamber 40 is arranged between the second channel 22 and the body 2, a second divider separating the second pneumatic compensation chamber 40 from the second channel 22.

The first and second pneumatic compensation chambers 30, 40, filled With nitrogen for example, are then subjected to distinct pressures. The first pneumatic compensation chamber 30 may therefore be subjected to a low pressure, of between 4 and 10 bar, while the second pneumatic compensation chamber 40 is subjected to a high pressure, of between 25 and 100 bar.

During its transfer from the compression chamber 3 to the hydraulic compensation chamber 10, the first fluid will then begin by compressing the first pneumatic compensation chamber 30.

When this first pneumatic compensation chamber 30 reaches a maximum pressure, the first fluid will then press the second pneumatic compensation chamber 40.

Furthermore, according to FIG. 1, it is possible to furnish the control piston 4 with a conventional steering cam 60 if the damper is mounted on a steering landing gear. The steering cam then makes it possible to reposition the landing gear wheel in a determined plane when the rotorcraft takes off and is no longer touching the ground.

FIG. 3 shows an isometric view of the compression chamber 3 of the damper according to the invention, furnished on its outer wall 3" with radial bores placed in a helix h.

According to this variant, the radial bores 8' are not situated one above the other. Consequently, the control piston 4 being capable only of making a translation movement along the longitudinal axis AX, a given point of the piston can pass only in front of a single radial bore 8'.

Since a given point of the piston passing a bore is destructive, piston wear will therefore be greatly slowed by installing the variant described by FIG. 3.

Figure 4:
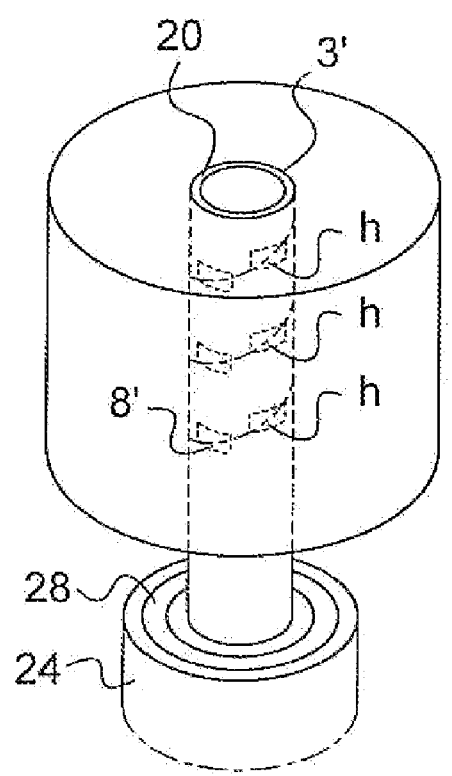

Similarly, FIG. 4 shows an isometric view of the compression chamber 3 furnished on its inner wall 3' with radial bores placed in a helix h. Similarly, the cylindrical tube comprises bores opposite the bores of the compression chamber so that the first channel can communicate with the inside of the compression chamber.

According to FIG. 3 or FIG. 4, the variable-section radial opening 8 comprises a plurality of radial bores 8' arranged in a wall of the compression chamber, the inner wall 3' or the outer wall 3" of this compression chamber, while being placed in a helix h.

Naturally, the present invention is subject to many variations concerning its application. Although several embodiments have been described, it is clearly understood that it is not conceivable to identify exhaustively all the possible embodiments. It can of course be envisaged to replace a means described with an equivalent means without departing from the context of the present invention.

For example, the expansion chamber 50 is optional. The expansion means is then not furnished with the disk 24 and the first non-return valve 27.

What is claimed is:

1. A damper having at least one pneumatic chamber, the damper comprising:
   an annular compression chamber having a cylindrical inner wall and a cylindrical outer wall, the outer wall defining a radial opening;
   a hollow cylindrical tube forming a first channel, the tube connected to the inner wall of the compression chamber;
   a body surrounding and attached to the annular compression chamber; and a control piston configured to move relative to the body, the control piston having a rod connected to a head, wherein the rod protrudes from the body, and the head is configured to slide in the compression chamber;
   wherein the radial opening of the compression chamber has a section that is variable depending on a position of the piston;
   wherein the body and the outer wall of the annular compression chamber form a second channel to hydraulically link the radial opening with the first channel; and
   wherein the control piston and an end of the hollow cylindrical tube form a hydraulic compensation chamber configured to receive a first fluid expelled from the annular compression chamber via the radial opening when the control piston moves.

2. The damper according to claim 1, wherein the hydraulic compensation chamber is arranged inside the rod of the control piston.

3. The damper according to claim 1, wherein the radial opening comprises a plurality of radial bores arranged in a longitudinal direction (AX) of the annular compression chamber, the bores successively masked by the control piston when the control piston moves.

4. The damper according to claim 1, wherein the first channel places the compression chamber and the hydraulic compensation chamber in communication.

5. The damper according to claim 1 wherein the hollow cylindrical tube protrudes from the said compression chamber.

6. The damper according to claim 1, wherein the first channel adjoins the hydraulic compensation chamber.

7. The damper according to claim 1, wherein the control piston has a first pneumatic chamber placed inside the rod and positioned between a bottom of the rod and the hydraulic compensation chamber.

8. The damper according to claim 7, further comprising a first divider separating the first pneumatic chamber from the hydraulic compensation chamber.

9. The damper according to claim 8, wherein the first divider is a movable divider piston.

10. The damper according to claim 8, wherein the first divider is a membrane.

11. The damper according to claim 7, further comprising a second pneumatic chamber placed inside the body and positioned between the second channel and the body.

12. The damper according to claim 11, wherein the second pneumatic chamber is placed outside the control piston.

13. The damper according to claim 11, further comprising a second divider separating the second pneumatic chamber from the second channel.

14. The damper according to claim 13, wherein the second divider is a movable divider piston.

15. The damper according to claim 13, wherein the second divider is a membrane.

16. The damper according to claim 1, further comprising a first and a second pneumatic chamber, one of the pneumatic chambers is at low pressure while the other of the pneumatic chambers is at high pressure.

17. The damper according to claim 1, further comprising an expansion and compression means.

18. The damper according to claim 17, wherein an end of the hollow cylindrical tube leads to the hydraulic compensation chamber; and wherein the expansion means comprises a disk arranged at the end of the tube, a center of the disk being hollowed out so as not to obstruct the first channel and the disk having an outer periphery having a sealed contact with an inside surface of the rod of the control piston.

19. The damper according to claim 18, wherein the disk defines at least a first perforation; and wherein the expansion and compression means comprises at least a preloaded first non-return valve obstructing at least a first perforation of the disk.

20. The damper according to claim 19, wherein the head of the control piston defines at least a second perforation;

wherein an expansion chamber is defined inside the control piston and between the disk of the hollow tube and the head of the control piston; and wherein the expansion and compression means has at least a preloaded second non-return valve obstructing the at least a second perforation, the at least a second perforation configured to place the compression chamber in communication with the expansion chamber.

21. A damper having at least one pneumatic chamber, the damper comprising:

an annular compression chamber having a cylindrical inner wall and a cylindrical outer wall, the outer wall defining a radial opening;

a hollow cylindrical tube forming a first channel, the tube connected to the inner wall of the compression chamber;

a body surrounding and attached to the annular compression chamber;

a control piston configured to move relative to the body, the control piston having a rod connected to a head defining at least a perforation, wherein the rod protrudes from the body, and the head is configured to slide in the compression chamber; and an expansion and compression means having at least a preloaded non-return valve obstructing the at least a perforation, the at least a perforation configured to place the compression chamber in communication with an expansion chamber defined by the inside of the control piston, an end of the hollow tube, and the head of the control piston;

wherein the radial opening of the compression chamber has a section that is variable depending on a position of the piston;

wherein the body and the outer wall of the annular compression chamber form a second channel to hydraulically link the radial opening with the first channel; and wherein the control piston and an end of the hollow cylindrical tube form a hydraulic compensation chamber configured to receive a first fluid expelled from the annular compression chamber via the radial opening when the control piston moves.

* * * * *